June 1, 1943.  C. F. ROSS  2,320,397
COUPLING HOLDER
Filed Aug. 3, 1940

INVENTOR.
CHARLES F. ROSS
BY Samuel Weisman
ATTORNEY.

Patented June 1, 1943

2,320,397

UNITED STATES PATENT OFFICE 2,320,397

COUPLING HOLDER

Charles F. Ross, Detroit, Mich., assignor to Power Brake Parts Manufacturing and Sales Company, Detroit, Mich., a corporation of Michigan Application August 3, 1940, Serial No. 350,718

1 Claim. (Cl. 248—75)

The present invention pertains to a novel coupling holder designed particularly for use in connection with motor tractors and trailers.

It is well known that one or more pipe lines are extended from the tractor or its motor to the trailer for the operation of various appliances thereon such, as, for example, the vacuum brakes. Occasionally, however, the tractor runs without the trailer, and it is then highly desirable not only to support the pipe line or hose on the tractor but also to close it and protect it from the entrance of dirt and other foreign matter therein.

The principal object of this invention is to provide a simple and effective device for accomplishing these purposes. It is in the nature of a locking and sealing cap adapted to be supported by a convenient part of the tractor, such as the cab, and to receive the coupling that is usually fitted on the free end of the pipe line. The device is so constructed as to receive the coupling by a simple insertion and to lock it automatically in the cap. Also, the coupling becomes sealed within the cap so that no fluid or solid matter can escape from or enter the pipe line. The device which automatically locks the coupling in the cap is normally urged to locking position by means of a spring and is fitted with a manual retracting means such as a finger piece for releasing the coupling when desired.

The invention is fully disclosed by way of example in the following description and in the accompanying drawing in which.

Reference to these views will now be made by use of like characters which are employed to designate corresponding parts throughout.

Figure 1:
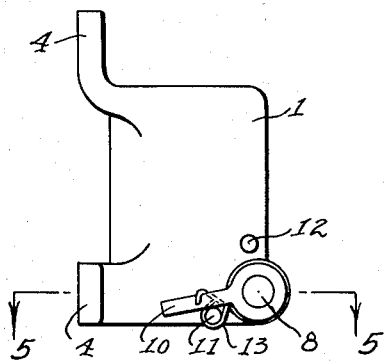
Figure 1 is a side elevation of the device.

The previously mentioned cap is in the form of a housing 1 formed preferably as a casting, having a cavity 2 open at the lower end for access, as designated by the numeral 3. The cap or housing is formed with a suitable number of attaching devices such as ears 4 which may be fastened to a suitable part of the tractor, such as the upper portion of the cab.

The fluid carrying line or hose 5 is of considerable length and extends from the tractor to be coupled to an appliance on the trailer, as well known in the art. For this purpose, the free end of the hose 5 is fitted with a coupling 6 formed with a peripheral groove 7 in its outer surface for a purpose that will presently appear.

Figure 2:
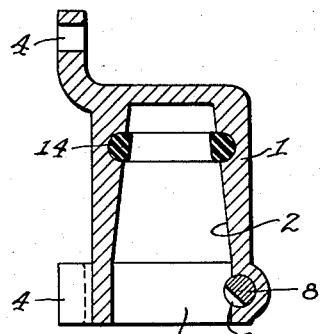
Figure 2 is a vertical section thereof and a parallel plane.
Figure 4:
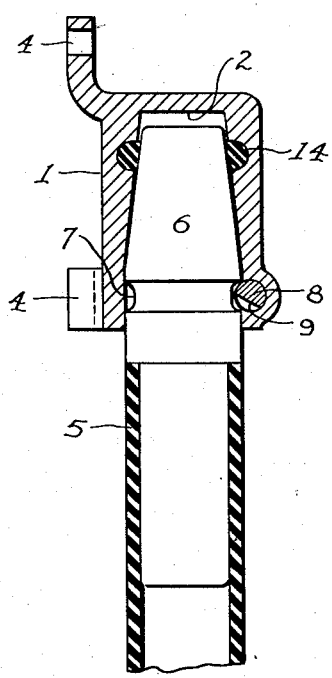
Figure 4 is a vertical section of the device, with the coupling inserted therein.
Figure 3:
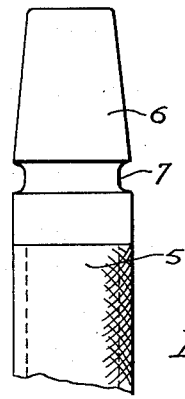
Figure 3 is an elevation of the free end of the hose and its coupling.
Figure 5:
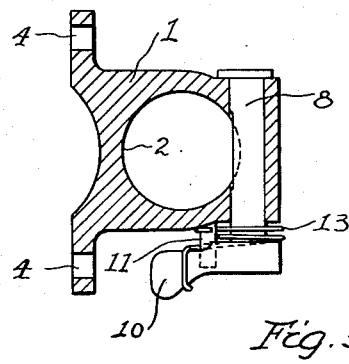
Figure 5 is a section on the line 5—5 of Figure 1.

In the casting 1 is journaled a locking pin 8 so positioned that a portion of its cylindrical surface is adapted to extend into the cavity 2, as may be seen in Figures 2, 4 and 5. A portion of the pin is cut to form a flat surface 9 adapted to line up with the inner wall of the cavity and thereby leave the cavity unobstructed.

One end of the locking pin carries a finger piece 10 by means of which the pin may be manually turned, as will presently appear. Stop pins 11 and 12 are formed on the casting at opposite sides of the finger piece to limit the movement thereof. A wire spring 13 is coiled about the locking pin and anchored on the finger piece and the stop pin 11 in a manner to hold the lock and pin normally in the locking position as shown in Figures 2 and 4.

When the tractor is run without the trailer, the fluid line 5 is supported and shut off by inserting the coupling 6 in the housing 1, as shown in Figure 4. In this movement, the coupling is at first obstructed by the locking pin but, on engaging the flat surface 9, it turns the pin against the action of the spring 13 to the position where the surface 9 is substantially flush with the wall of the cavity 2 or at least clear out of the cavity. When the groove 7 reaches the level of the locking pin 9, the latter is returned by the compressed spring to the locking position shown in Figures 2 and 4. In its final position, the coupling 6, which is preferably tapered, enters a ring gasket 14 mounted in the wall of the cavity 2, whereby the coupling is protected and fluid sealed, as well as supported by the locking pin 8. In order to release the coupling for removal, the locking pin is rotated by pushing the finger piece 10 against the stop pin 12, whereby the flat surface 9 lines up with the inner wall of the cavity and the locking pin no longer obstructs movement of the coupling. When the finger piece is released, the spring 13 returns the locking pin to its normal locking position previously described.

Although a specific embodiment of the invention has been illustrated and described, it will be understood that various alterations in the details of construction may be made without departing from the scope of the invention as indicated by the appended claim.

What I claim is:

Means for supporting and sealing the coupling end of a disconnected hose for transmitting fluid from one vehicle to another, comprising a housing having a closed end and an opposite open end adapted to receive a coupling, a locking member mounted in a wall of the housing and adapted to extend into the interior of the housing to lock the coupling therein, means normally holding said member in locking position, means in said housing for sealing against the inserted coupling, and means for attaching said housing to a support.

CHARLES F. ROSS.